United States Patent
Mayer et al.

(10) Patent No.: US 8,213,003 B2
(45) Date of Patent: Jul. 3, 2012

(54) METHOD AND DEVICE FOR DETERMINING THE POSITION OF A SENSOR

(75) Inventors: Thomas Mayer, Kolbermoor (DE); Thomas Nasswetter, Nussdorf am Inn (DE); Marcus Steinbichler, Neubeuern (DE); Andreas Weber, Rosenheim (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 344 days.

(21) Appl. No.: 12/482,712

(22) Filed: Jun. 11, 2009

(65) Prior Publication Data

US 2010/0149524 A1 Jun. 17, 2010

(30) Foreign Application Priority Data

Jun. 12, 2008 (DE) .......................... 10 2008 027 976

(51) Int. Cl.
*G01B 11/26* (2006.01)
*G01C 1/06* (2006.01)

(52) U.S. Cl. ........................................ 356/138; 356/139
(58) Field of Classification Search ........... 356/138–141
See application file for complete search history.

(56) References Cited

U.S. PATENT DOCUMENTS

| 4,209,253 A * | 6/1980 | Hughes | 356/139.08 |
| 2008/0216552 A1* | 9/2008 | Ibach et al. | 73/1.01 |

FOREIGN PATENT DOCUMENTS

| DE | 102004021892 | 12/2005 |
| DE | 102004043912 | 11/2006 |
| DE | 202005054819 | 5/2007 |
| JP | 09089560 | 4/1997 |
| JP | 11271043 | 10/1999 |
| JP | 2002182742 | 6/2002 |
| JP | 2003015739 | 1/2003 |
| JP | 2004337710 | 12/2004 |
| JP | 2007033205 | 2/2007 |
| JP | 2007303994 | 11/2007 |
| JP | 2008064729 | 3/2008 |

* cited by examiner

*Primary Examiner* — Michael P Stafira
(74) *Attorney, Agent, or Firm* — Dilworth & Barrese, LLP.

(57) ABSTRACT

The present invention relates to a method and a device for determining the spatial position of a sensor, in which a rough position information initially is determined by rough detection of the position of the sensor, and then the more accurate position of the sensor is obtained by measuring at least three reflectors mounted on the sensor with a laser tracker, wherein the search region of the laser of the laser tracker is limited for the reflectors with reference to the rough position information.

20 Claims, 1 Drawing Sheet

METHOD AND DEVICE FOR DETERMINING THE POSITION OF A SENSOR

BACKGROUND OF THE INVENTION

This invention relates to a method and a device for determining the spatial position of a sensor, in particular for determining the translatory and rotatory position of a 3D sensor for the three-dimensional digitization and/or three-dimensional measurement of large objects.

A method for the three-dimensional digitization (3D digitization) of objects is known for instance from DE 10 2005 043 912 A1. For 3D digitization a 3D sensor is used, which determines the three-dimensional coordinates (3D coordinates) of the surface of an object. In general, it is necessary to move the 3D sensor in space into various recording positions, in order to assemble the entire object surface to be measured out of partial surfaces measured at the individual recording positions. Such assembly requires the registration of the individual recording positions in a superordinate coordinate system. This so-called global registration requires high accuracy.

When using a white-light strip projection system as a 3D sensor, it is known to carry out the global registration by means of photogrammetry. For this purpose, marks must be provided on the object or on a link and be measured separately with a photogrammetry equipment. Photogrammetry offers high accuracy, but is disadvantageous because of the additional effort for preparation with the marks and the separate measurement thereof.

Furthermore, it is known to measure the position of the 3D sensor with a laser tracker, so as to carry out the global registration of each individual recording position by means of these measurement data. For this purpose, at least three suitable reflectors must be mounted on the 3D sensor, and in each recording position of the 3D sensor, the reflectors must be measured successively with the laser beam of the laser tracker. The measurement data of the laser tracker allow a global registration with the highest accuracy. What is disadvantageous, however, is the time-consuming detection of the reflectors in space after repositioning the sensor, which increases the time required for digitizing the measurement object.

SUMMARY OF THE INVENTION

Therefore, it is the object of the present invention to propose an improved method and an improved device for determining the spatial position of a sensor. In particular, the method and the device of the invention should provide for a high accuracy of the global registration of a 3D sensor with little expenditure of time.

In accordance with the invention, this object is solved by a method according to claim 1 and a device according to claim 8. Advantageous aspects are described in the sub-claims.

The method for determining the position of a sensor in accordance with the invention is characterized in that the position initially is determined more roughly and then more accurately. The rough detection of the position of the sensor need not be effected with high accuracy, in particular not with the accuracy desired for the global registration. Obtaining the rough position information therefore can be effected with any means. Using means which allow a fast and simple determination of the position is particularly advantageous. Upon determination of the rough position, a more accurate determination of the position then is effected by means of a laser tracker. For this purpose, at least three suitable reflectors, which are mounted on the sensor, are searched for with the laser tracker and measured. The search region, in which the laser of the laser tracker searches for the reflectors, is limited by the rough position information obtained when detecting the rough position of the sensor. This provides for finding the reflectors faster by using the laser tracker, so that measuring the reflectors with the laser tracker can be effected faster.

Thus, the invention provides the advantage that on the one hand the high accuracy of the laser tracker is utilized and on the other hand using the rough position information provides for a particularly fast measurement of the position of the 3D sensor with the laser tracker. Hence, the invention allows a particularly fast global registration and a particularly fast determination of the global position of the sensor with a high accuracy at the same time.

The reflectors can also be mounted on the sensor by means of brackets or cantilevers. Advantageously, the reflectors are mounted on the body of the sensor or rigidly connected with the same. Furthermore advantageously, the position of the reflectors is not changed any more, once they have been mounted on the sensor, and the relative position of the reflectors with respect to each other and/or to the sensor then is determined. From the relative position of the reflectors and the global position of the reflectors to be detected with the laser tracker, the global position of the sensor in space then can be determined in terms of translation and rotation. In a furthermore advantageous aspect of the invention, the relative position of the reflectors with respect to each other and/or to the sensor is determined by measurement with the laser tracker.

In another preferred aspect, the rough position information for the sensor or for the reflectors on the sensor is obtained from the position information of a robot used for moving the sensor. Similarly, the rough position information also can be obtained from the position information of another kind of axle system used for moving the sensor.

In yet another preferred aspect, the rough position information is obtained by one or more additional cameras which observe the measurement space.

In yet another preferred aspect, the rough position information is obtained with an acceleration sensor and an inclination sensor, by means of which the translation and the rotation of the sensor is detected during its movement, for instance between the individual recording positions.

In yet another aspect, the rough position information is obtained by an additional 6D sensor, which is mounted on the sensor. Such 6D sensor detects the position in six dimensions, namely three translatory and three rotatory dimensions.

BRIEF DESCRIPTION OF THE DRAWING

One embodiment of the invention will now be explained with reference to FIG. 1, in which.

DESCRIPTION OF THE PREFERRED EMBODIMENT

Figure 1:
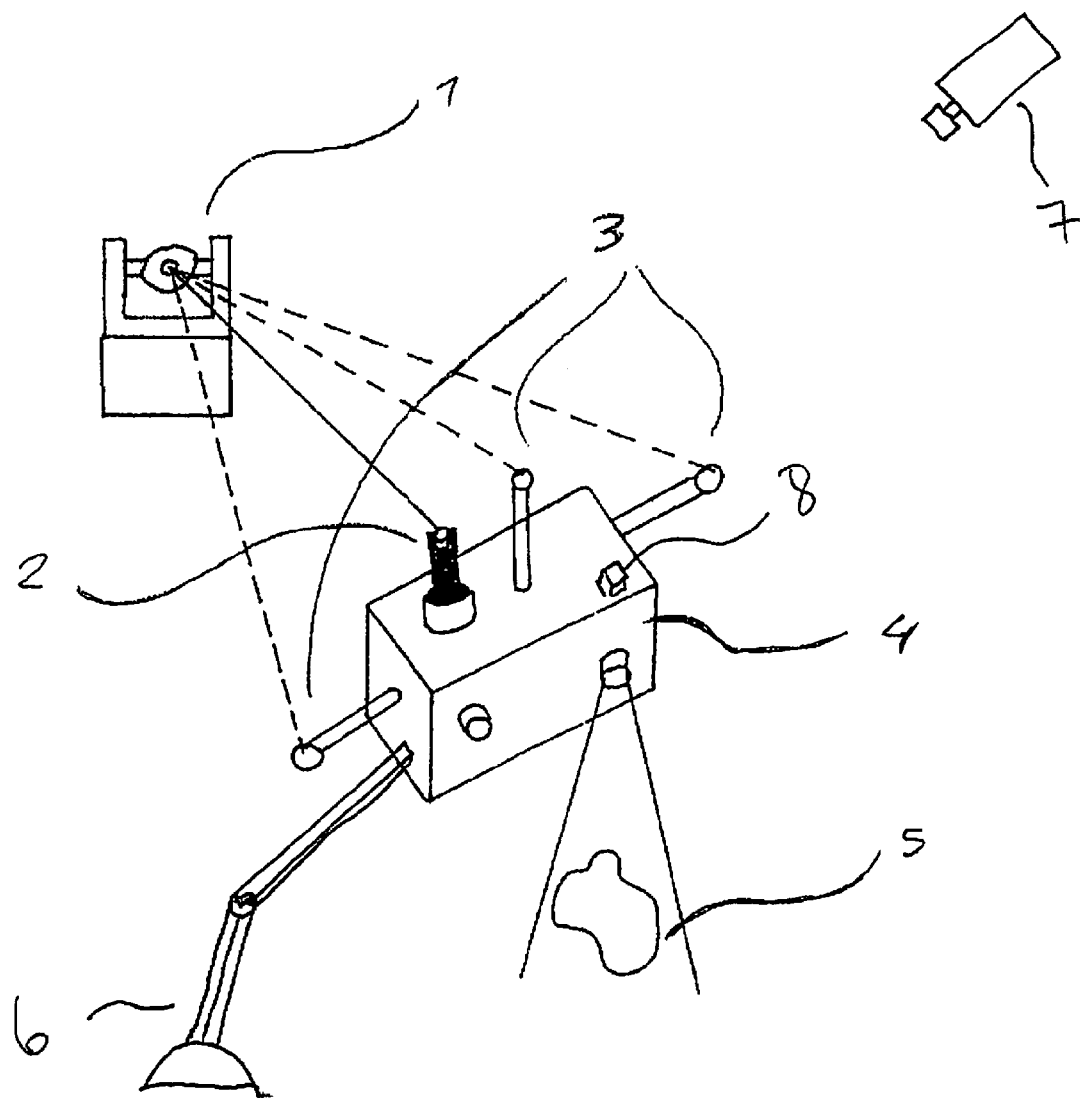
FIG. 1: shows a schematic view of a device in accordance with the invention.

FIG. 1 shows a device for measuring a measurement object 5 in accordance with the invention. The device comprises a 3D sensor 4 for 3D digitization of the surface of the measurement object 5. The 3D sensor can for instance be configured as a white-light strip projection system. On the rigid body of the 3D sensor 4, three reflectors 3 are mounted with rigid cantilevers. The position of the three reflectors 3 on the 3D sensor 4 remains unchanged.

The device furthermore comprises a laser tracker 1, with which on the one hand the 3D sensor can be measured with the highest accuracy and on the other hand the position of the reflectors 3 in space can be determined with the highest accuracy. In addition, the device comprises a 6D sensor 2, which is mounted on the body of the 3D sensor 4. Although 6D sensor 2 is illustrated as a single unit, more than one 6D sensor 2 can be mounted to sensor 4. With this 6D sensor, the position of the 3D sensor can roughly be determined in terms of translation and rotation. A robot or other type of axle system 6 can also be included and configured to move the sensor 4. At least one camera(s) 7 can also be provided to observe the measurement space. One or more sensor(s) 8 can also be included. Sensor(s) 8 can include, for example, an acceleration sensor for measuring translation of sensor 4 and/or an inclination sensor for measuring rotation of sensor 4.

In accordance with an embodiment of the method of the invention, the laser tracker 1 initially is used for measuring the 3D sensor 4 together with the reflectors 3 mounted thereon. Based on this, the relative position of the reflectors 3 with respect to each other is determined. Then, the measurement object 5 is measured with the 3D sensor 4 from various recording positions for the purpose of 3D digitization. In each recording position, the rough position of the 3D sensor 4 and the rough position of the reflectors 3 initially is determined with the 6D sensor 2. The rough position information can also be obtained from position information of robot 6, by observation of the measurement space by camera(s) 7, and/or by detecting the translation and/or rotation of sensor 4 with sensor(s) 8. This rough position information is utilized to limit the search region, in which the laser of the laser tracker 1 searches for the reflectors 3, as much as possible. In the greatly limited search regions, the laser tracker searches for the reflectors and determines their position with the highest accuracy. From the positions of the reflectors 3 determined with the laser tracker 1 and from the known position of the reflectors 3 with respect to each other, the global position of the 3D sensor then is calculated in terms of translation and rotation.

In this way, the above-described embodiment of the invention provides for a particularly fast and particularly accurate global registration of a sensor for the 3D digitization of large objects.

The invention claimed is:

1. A method for determining the spatial position of a sensor (4), in which a rough position information initially is obtained by rough detection of the position of the sensor, and the more accurate position of the sensor then is determined by measuring at least three reflectors (3) mounted on the sensor with a laser tracker (1), wherein a search region, in which the laser of the laser tracker searches for the reflectors, is limited by the rough position information obtained when detecting the rough position of the sensor, to provide for finding the reflectors faster by using the laser tracker, so that measuring of the reflectors with the laser tracker can be effected faster.

2. The method according to claim 1, in which the position of the at least three reflectors remains unchanged after mounting the same on the sensor, and the position of the reflectors relative to the sensor and/or relative to each other is determined.

3. The method according to the claim 2, in which the relative position of the reflectors is determined by measurement with the laser tracker.

4. The method according to claim 1, in which the rough position information is obtained from the position information of a robot or another kind of axle system used for moving the sensor.

5. The method according to claim 1, in which the rough position information is obtained by one or more additional cameras which observe the measurement space.

6. The method according to claim 1, in which the rough position information is obtained with an acceleration sensor and an inclination sensor, by which the translation and the rotation of the sensor are detected.

7. The method according to claim 1, in which the rough position information is obtained by an additional 6D sensor (2) which is mounted on the sensor (4).

8. A device for determining the spatial position of a sensor (4) with means (2) for obtaining a rough position information by rough detection of the position of the sensor, with a laser tracker (1) for determining the more accurate position of the sensor by measuring the position of at least three reflectors (3) mounted on the sensor and with means for limiting a search region, in which the laser of the laser tracker searches for the reflectors, by the rough position information obtained when detecting the rough position of the sensor, to provide for finding the reflectors faster by using the laser tracker, so that measuring of the reflectors with the laser tracker can be effected faster.

9. The device according to claim 8, with a robot or another kind of axle system for moving the sensor and means for obtaining the rough position information from the position information of the robot or the axle system.

10. The device according to claim 8, with at least one additional camera observing the measurement space for obtaining the rough position information.

11. The device according to claim 8, with an acceleration sensor and an inclination sensor, which detect both the translation and the rotation of the sensor for obtaining the rough position information.

12. The device according to claim 8, with an additional 6D sensor (2) mounted on the sensor (4) for obtaining the rough position information.

13. The method according to claim 2, in which the rough position information is obtained from the position information of a robot or another kind of axle system used for moving the sensor.

14. The method according to claim 3, in which the rough position information is obtained from the position information of a robot or another kind of axle system used for moving the sensor.

15. The method according to claim 2, in which the rough position information is obtained by one or more additional cameras which observe the measurement space.

16. The method according to claim 3, in which the rough position information is obtained by one or more additional cameras which observe the measurement space.

17. The method according to claim 2, in which the rough position information is obtained with an acceleration sensor and an inclination sensor, by which the translation and the rotation of the sensor are detected.

18. The method according to claim 3, in which the rough position information is obtained with an acceleration sensor and an inclination sensor, by which the translation and the rotation of the sensor are detected.

19. The method according to claim 2, in which the rough position information is obtained by an additional 6D sensor (2) which is mounted on the sensor (4).

20. The method according to claim 3, in which the rough position information is obtained by an additional 6D sensor (2) which is mounted on the sensor (4).

* * * * *